United States Patent

Yamamuro et al.

[11] Patent Number: 5,810,670
[45] Date of Patent: Sep. 22, 1998

[54] METHOD OF MANUFACTURING CONNECTOR BOLT

[75] Inventors: Hironao Yamamuro, Kariya; Naoshige Taniguchi, Kasugai, both of Japan

[73] Assignees: Tsuda Kogyo Kabushiki Kaisha, Kariya; Kabushiki Kaisha Sanmei Seisakusho, Kasugai, both of Japan

[21] Appl. No.: 795,401

[22] Filed: Feb. 5, 1997

[51] Int. Cl.⁶ .................................................. B21H 3/02
[52] U.S. Cl. .................................................. 470/12; 470/8
[58] Field of Search ............................. 470/8, 9, 10, 12, 470/66, 70; 72/103, 104

[56] References Cited

U.S. PATENT DOCUMENTS

| | | | |
|---|---|---|---|
| 2,761,336 | 9/1956 | Greene et al. | 72/103 |
| 3,566,428 | 3/1971 | Neuschotz | 470/8 |
| 3,878,759 | 4/1975 | Carlson | 470/9 |
| 4,722,107 | 2/1988 | Kariya | 470/10 |

FOREIGN PATENT DOCUMENTS

| | | | |
|---|---|---|---|
| 57-56130 | 4/1982 | Japan | 72/104 |
| 57-127534 | 8/1982 | Japan | 72/104 |
| 58-97453 | 6/1983 | Japan | 72/104 |
| 62-244543 | 10/1987 | Japan | 72/104 |
| 1058697 | 12/1983 | U.S.S.R. | 72/104 |
| 1290562 | 9/1972 | United Kingdom . | |
| 1437733 | 6/1976 | United Kingdom . | |

*Primary Examiner*—Joseph J. Hail, III
*Assistant Examiner*—Ed Tolan
*Attorney, Agent, or Firm*—Dennison, Meserole, Pollack & Scheiner

[57] ABSTRACT

A method of manufacturing a connector bolt includes the steps of forming axial grooves on a part of the shank of the connector bolt, and then simultaneously performing a rolling process for thread formation around the shank part with the axial grooves formed thereon with a rolling tool and a different rolling process around a part of the shank without the axial grooves with a different rolling tool.

8 Claims, 5 Drawing Sheets

METHOD OF MANUFACTURING CONNECTOR BOLT

BACKGROUND OF THE INVENTION

1. Field of the Invention

This invention relates to a method of manufacturing connector bolts, i.e., bolts with passage grooves for use in fixing pipe joints.

2. Description of the Prior Art

FIGS. 3 and 4 show a connector bolt. In FIGS. 3 and 4, reference numeral 4 designates a spherical single-ended pipe joint having bolt insertion holes 6 and 7 formed in upper and lower wall portions. Reference numeral 1 designates a connector bolt which is inserted through bolt insertion holes 6 and 7 of the pipe joint 4 and also in a passage hole 12 formed in a fixed member 11 and which secures the pipe joint 4 to the fixed member 11. The connector bolt 1 has a shank formed with a thread 2 therearound. The shank also has axial grooves 3 which serve as passages for communicating spaces 15 and 16 in the spherical single-ended pipe joint 4 with the passage hole 12.

The axial grooves 3 have a depth greater than the height of the hills of the thread 2 and a length greater than the length of the thread 2. As shown in FIG. 5(a), the axial grooves 3 have a V-shaped section and are formed on the surface of the shank of the connector bolt 1 in a diametrically opposed relation.

Reference numerals 8 and 9 designate packings provided between the connector bolt 1 and the spherical single-ended pipe joint 4. Reference numeral 10 designates a pipe which is fitted in a cylindrical portion 5 of the pipe joint 4 and secured thereto by soldering or other means.

When the spherical single-ended pipe joint 4 is secured to the fixed member 11, the connector bolt 1 is inserted through the bolt insertion holes 6 and 7 in the pipe joint 4 and is then threadedly engaged with the passage hole 12 of the fixed member 11 by the thread 2. The spaces 15 and 16 in the pipe joint 4 and the passage hole 12 are thus communicated with one another by the axial grooves 3 formed on the shank of the connector bolt 1, so that fluid can be passed from the pipe 10 to the passage hole 12 or vice versa.

The number of axial grooves 3 can be determined in dependence on the rate of flow or the like. For example, where the flow rate is high, four grooves 3 may be provided (FIG. 5(b)). Where the flow rate is low, only a single groove 3 may be provided (FIG. 5(c)).

The sectional shape of the axial grooves or groove 3 is not limited to the V-shape, but it may as well be U-shape or circular (FIG. 5(c)). It is further possible to provide crescent notches 17 (FIG. 5(d)).

The manufacturing method of the prior art connector bolt will now be described.

First, the axial grooves 3 are formed on the shank of the connector bolt 1. The axial grooves 3 may be formed by machining, but they are desirably formed by a non-machining process such as cold forging or header processing.

The thread 2 is then formed using thread rolling dies or the like from opposite sides of the shank with the axial grooves 3.

As shown in FIG. 6, in the case of using thread rolling dies 20 having a height less than the length of the axial grooves 3, the dies 20 fall into the grooves 3 when they are brought to the position of the grooves 3. In this case, the connector bolt 1 cannot be rotated at a uniform speed, and the thread 2 cannot be accurately formed by rolling around the shank with the axial grooves 3 formed thereon.

Therefore, as shown in FIG. 7, in order to accurately form the thread 2 by rolling on the shank with the axial grooves 3 thereon while rotating the connector bolt 1 at a uniform speed, there have been proposed thread rolling dies 21 having a height greater than the length of the axial grooves 3.

The thread rolling dies 21 with a height greater than the length of the axial grooves 3, can always hold part of the shank without the axial grooves 3, and thus permits rotation of the connector bolt 1 at a uniform speed. It is thus possible to accurately form the thread 2 around a part of the shank without the axial grooves 3 as well.

Thus, in order to prevent the thread rolling dies from falling into the axial grooves, the prior art manufacturing method of a connector bolt uses a single set of dies having a height greater than the length of the axial grooves of the bolt, so that the thread rolling around a shank part with the axial grooves and the thread rolling around a shank part without the axial grooves are performed at a time. As a result, the thread can be accurately formed around the shank with the axial grooves. However, since the connector bolt is not gripped securely, the connector bolt may possibly be deviated in an axial direction, resulting in a thread pitch deviation.

SUMMARY OF THE INVENTION

It is an object of the invention to provide a method of manufacturing a connector bolt which can eliminate such a thread pitch deviation due to the axial deviation of the connector bolt.

To attain the above object, according to the invention, axial grooves are first formed on a part of the shank of the connector bolt, and then a rolling process for thread formation around the shank part with the axial grooves formed thereon and a different rolling process around a part of the shank without the axial grooves are performed at a time with separate machining tools.

According to the invention, since the shank part without the axial grooves is always held clamped by the processing tool for the different rolling process, it is possible to accurately form the thread by rolling around the shank part with the axial grooves formed thereon. In addition, since the thread formation by rolling with the thread forming tool and the different rolling process with the different rolling tool are performed at a time, it is possible to eliminate axial deviation of the connector bolt that would be caused in the case of using only the thread forming tool, thus eliminating a thread pitch deviation.

In an alternative form of the invention, a connector bolt is fabricated by performing the thread formation by rolling around the shank part with the axial grooves formed thereon and the formation of a groove by rolling around a shank part without the axial grooves simultaneously with the separate tools.

In a further modification of the invention, a connector bolt is fabricated by performing the thread formation by rolling around the shank part with the axial grooves formed thereon and the formation of roulettes by rolling around a shank part without the axial grooves simultaneously with the separate tools.

In a still further modification of the invention, a connector bolt is fabricated by performing the thread formation by rolling around the shank part with the axial grooves formed thereon and the formation of a serration by rolling around a shank part without the axial grooves simultaneously with the separate tools.

Thus, according to the invention, the groove can be formed by rolling around the shank part without the axial grooves with a cheaper tool then the thread rolling tool.

The above and other objects, features and advantages of the invention will become more apparent from the following detailed description of the preferred embodiment when the same is read with reference to the accompanying drawings.

DETAILED DESCRIPTION OF THE PREFERRED EMBODIMENT

Figure 2:
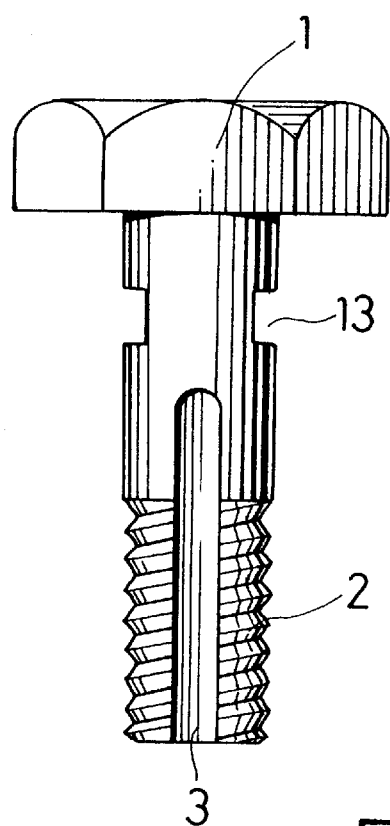
FIG. 2 is a view showing the connector bolt fabricated by the method of manufacturing a connector bolt according to the embodiment of the invention.
Figure 3:
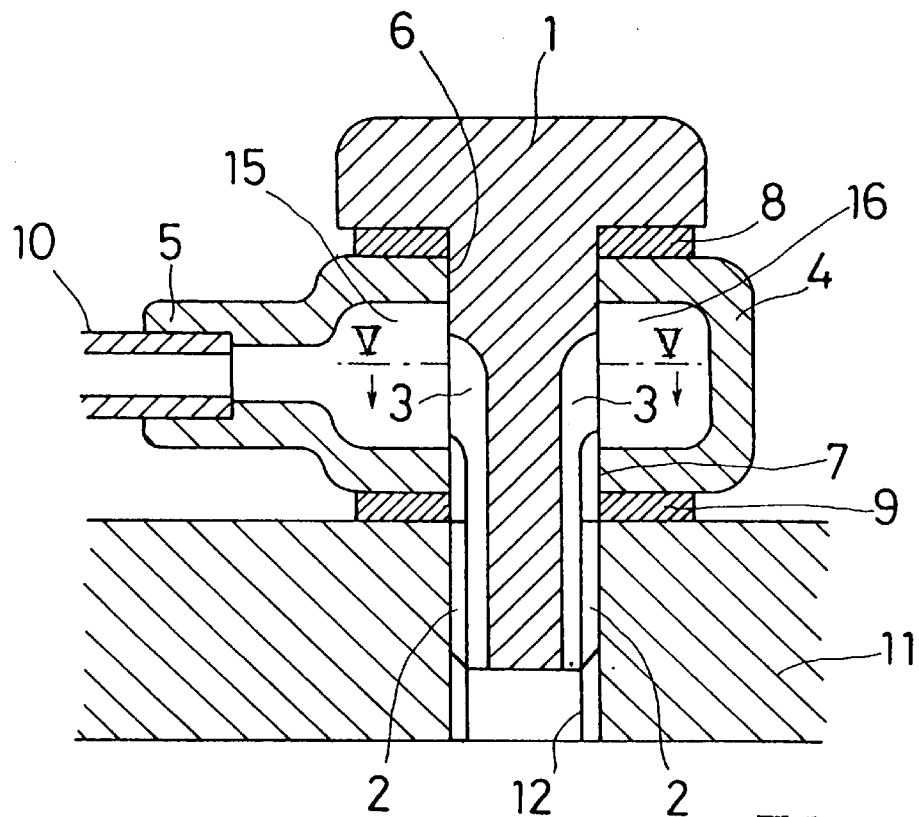
FIG. 3 is a schematic sectional view showing an apparatus including a pipe joint.
Figure 4:
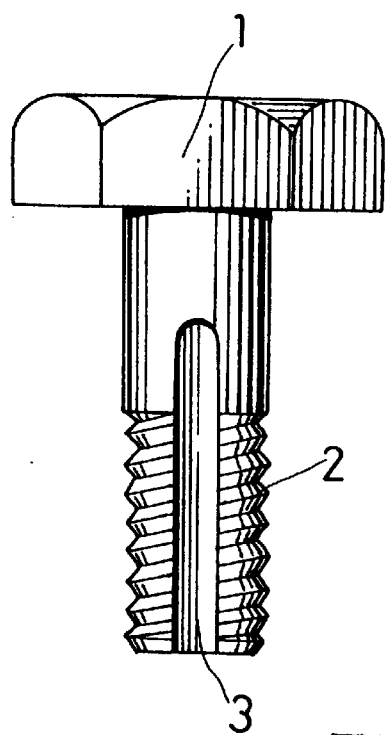
FIG. 4 is a view showing a prior art connector bolt.
Figures 5A, 5B:
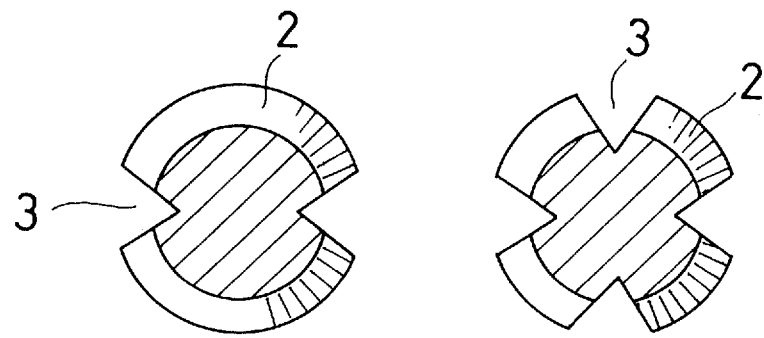
FIGS. 5(a) to 5(d) are sectional views taken along line V—V in FIG. 3.
Figures 5C, 5D:
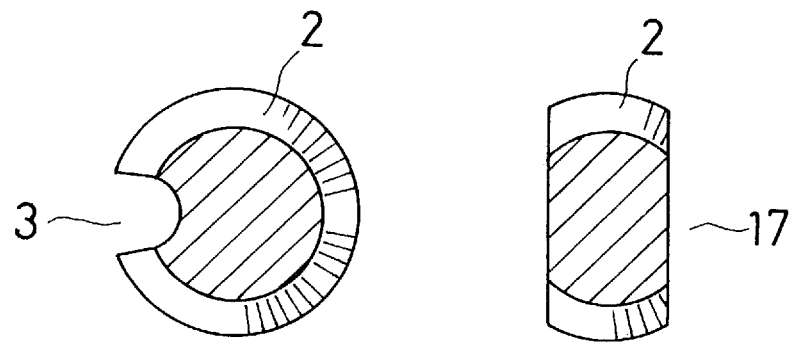
Figure 6:
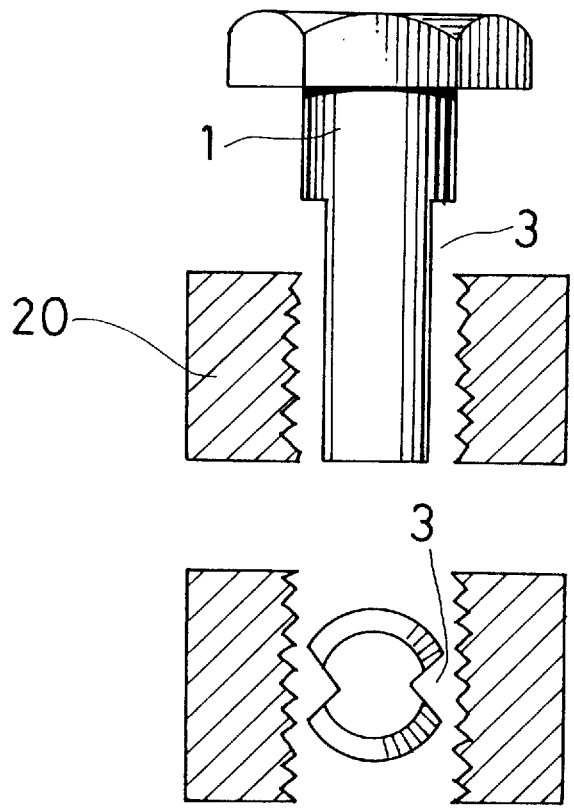
FIG. 6 is a view showing a prior art method of manufacturing a connector bolt.
Figure 7:
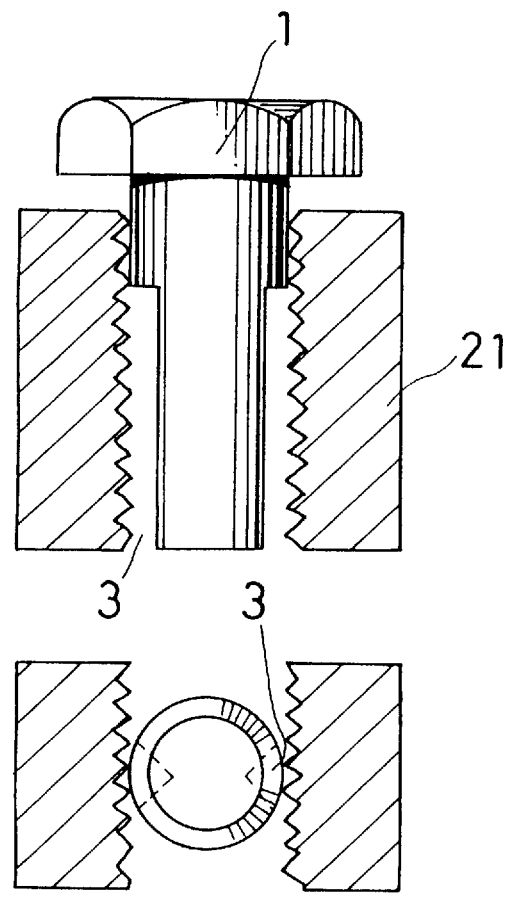
FIG. 7 is a view showing a different prior art method of manufacturing a connector bolt.

An embodiment of the method of manufacturing a connector bolt according to the invention will now be described with reference to FIG. 2.

Figure 1:
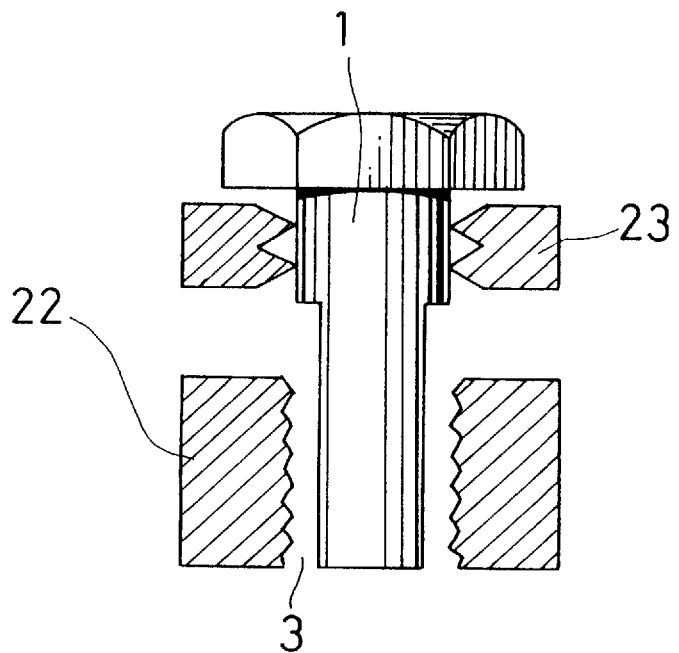
FIG. 1 is a view showing a method of manufacturing a connector bolt according to an embodiment of the invention.

In FIG. 1, reference numeral 22 designates a thread rolling die set or like machining tool for forming a thread 2 by rolling around a part of a bolt shank with axial grooves 3. Reference numeral 23 designates a groove forming die set or like machining tool for forming a groove 13 by rolling on a part of the bolt shank without the axial grooves 3.

In the manufacture a connector bolt 1, like the prior art manufacturing method described above, the axial grooves 3 are formed on a part of the shank of the bolt 1.

Then, the thread 2 is formed by rolling on the shank part with the axial grooves 3 from opposite sides of the shank part with the thread rolling die set 22, while the groove 13 is formed on the shank part without the axial grooves 3 by rolling from opposite sides of the shank part with the grooves forming die set 23. The groove formation die set 23 and the groove 13 formed by the groove formation die set 23 cooperate to securely grip the connector bolt 1.

By simultaneously performing the formation of the thread 2 by rolling around the shank part with the axial grooves 3 and the formation of the groove 13 by rolling around the shank part without the axial grooves 3, even if the thread rolling dies 22 fall into the axial grooves 22 when the dies 22 are brought to the position of the grooves 22, the connector bolt 1 can be rotated at a uniform speed by means of the groove formation die set 23. The thread 22 thus can be accurately formed by rolling.

With the simultaneous use of the thread rolling dies 22 for forming the thread 2 and the groove forming dies 23 for forming the groove 23, it is possible to eliminate axial deviation of the connector bolt 1 that may be caused in the case of using only the thread rolling dies 22, thus eliminating a thread pitch deviation.

Moreover, the die hill angle of the groove forming dies 23 for forming the groove 13 may be made greater than the die hill angle of the thread rolling dies 22 for forming the thread 22, and thus the groove forming dies 23 cost less than the thread rolling dies 22.

The groove 13 formed around the shank part without the axial grooves may have various sectional profiles, such as U-shaped, V-shaped and circular ones.

It is further possible to form roulettes, a serration, satin finished surfaces, etc., as well as the groove by rolling around the shank part without the axial grooves 3. In such cases, machining devices for forming roulettes, serration, satin finished surface, etc. are used in lieu of the groove forming dies for the groove formation.

By forming such roulettes, serration, satin finished surfaces, etc. by rolling on the shank part without the axial grooves simultaneously with the thread formation by rolling on the shank part with the axial grooves, it is possible to eliminate axial deviation of the connector bolt, thus eliminating a thread pitch deviation, and also to use cheaper machining devices than those for the thread formation.

As has been described in the foregoing, according to the invention, the rolling process for the thread formation around the shank part with the axial grooves formed thereon and the different rolling process around a part of the shank without the axial grooves are performed with separate machining tools, and the thread thus can be accurately formed around the shank part with the axial grooves. In addition, it is possible to eliminate axial deviation of the connector bolt, thus eliminating a thread pitch deviation.

Moreover, according to the invention, the thread formation by rolling around the shank part with the axial grooves and the formation of a groove, roulettes and a serration, respectively, by rolling around a shank part without the axial grooves are performed at a time with separate machining tools, and the groove, roulettes and serration thus can be formed by rolling with a cheaper tool than the thread rolling tool.

While a preferred embodiment of the invention has been described, it is to be understood that various changes and modifications in the details of the design may be made without departing from the scope and spirit of the invention.

What is claimed is:

1. A method of fabricating a connector bolt comprising the following steps:

forming axial grooves on a lower part of the shank of a bolt, and performing a rolling process for thread formation around the lower shank part with the axial grooves formed thereon with a primary rolling tool and a secondary rolling process around an upper part of the shank without the axial grooves with a secondary rolling tool, said primary and said secondary rolling process being simultaneously performed.

2. The method according to claim 1, wherein the secondary rolling process forms a groove by rolling.

3. The method according to claim 1, wherein the secondary rolling process forms roulettes by rolling.

4. The method according to claim 1, wherein the secondary rolling process forms a serration by rolling.

5. A method of fabricating a connector bolt from a bolt having a head, an upper and lower shank portion, said method comprising:

forming grooves in an axial direction of the lower shank portion;

performing simultaneously a first and second rolling process;

said first rolling process employing a first tool at the upper shank portion;

said second rolling process employing a second tool at the lower shank portion, the second tool forming threads.

6. The method according to claim 5, wherein said first tool forms a groove around the upper shank portion.

7. The method according to claim 5, wherein said first tool forms roulettes around the upper shank portion.

8. The method according to claim 5, wherein said first tool forms a serration around the upper shank portion.

* * * * *